Sept. 9, 1969     G. C. SMITH, JR     3,466,013
WINCH CABLE ANTI-SLACK UNIT
Filed Nov. 8, 1967     2 Sheets-Sheet 1

INVENTOR.
GARY C. SMITH JR.
BY WOOD, HERRON & EVANS

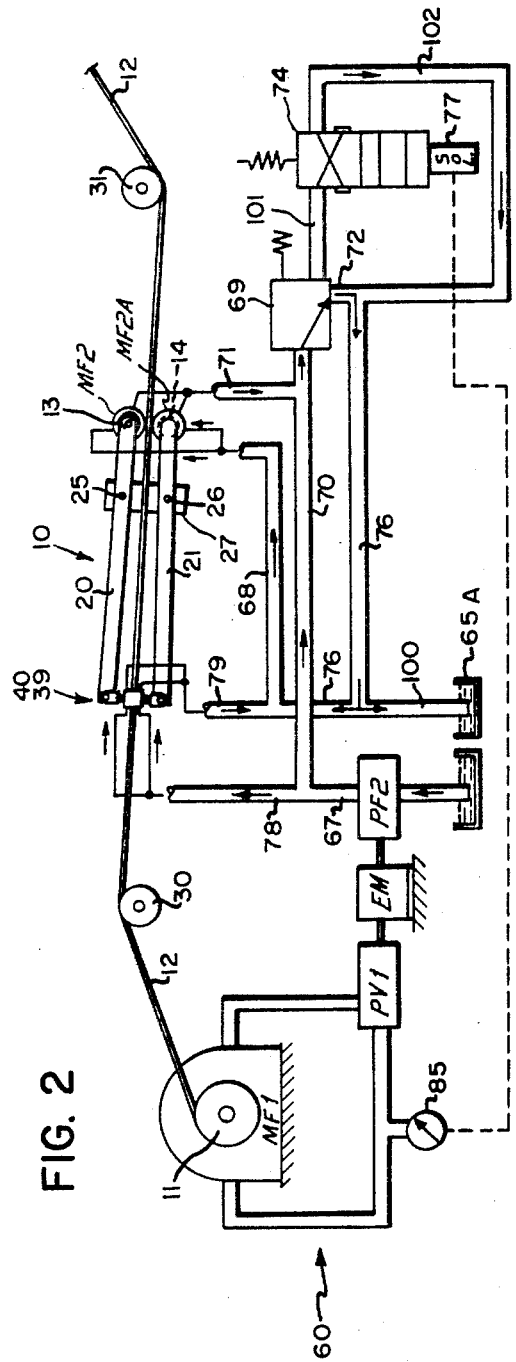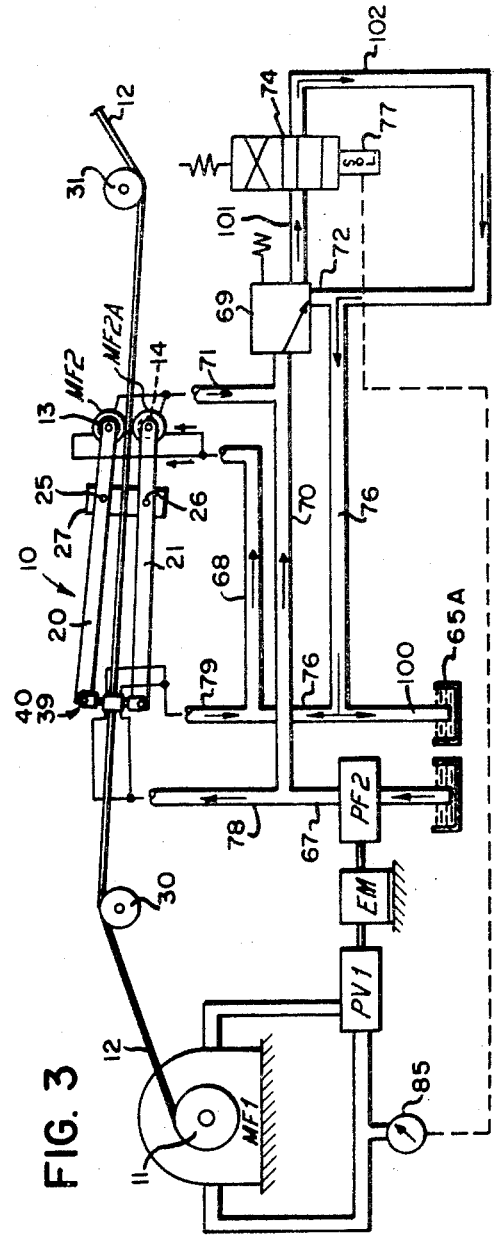

United States Patent Office 3,466,013
Patented Sept. 9, 1969

3,466,013
WINCH CABLE ANTI-SLACK UNIT
Gary C. Smith, Jr., Columbus, Ohio, assignor to Abex Corporation, New York, N.Y., a corporation of Delaware
Filed Nov. 8, 1967, Ser. No. 681,386
Int. Cl. B66d 1/50, 1/28
U.S. Cl. 254—175.7                    15 Claims

ABSTRACT OF THE DISCLOSURE

A tensioning device for preventing cable from becoming entangled or fouled as it is payed out or taken in from a motor driven drum or winch. The cable passes between a pair of opposed motor driven pulleys operative to pull the cable under tension off of the drum as cable is payed out and operative to maintain a predetermined tension on the cable when it is taken in. The cable extends tangentially to the opposed pulleys so that the pulley support shafts do not carry and are not loaded by the tension on the cable.

BACKGROUND OF THE INVENTION

In the use of power driven winches, slack line or cable creates a dangerous and often troublesome condition. If slack line is allowed to develop on the drum or reel of the winch while the drum is rotating, the line becomes entangled or fouled on the drum so that it is locked against motion in either direction. Entangling or fouling of the line of a winch can occur as a result of slack in the line during either the paying out or taking in of cable. If the slack occurs while cable is being payed out, it results in an "overriding" turn of cable on the drum which may then become trapped or "birdcaged" by succeeding turns. In the paying in direction, slack results in a loosely spooled cable which can then "bury" itself in the loose outer layers of cable when tension is subsequently applied to the cable.

In co-pending U.S. patent application, Ser. No. 620,724, filed Mar. 6, 1967, and assigned to the assignee of this application, there is disclosed a system for avoiding cable slack by maintaining a predetermined tension level in a winch cable while the cable is payed out from or taken in upon a winch drum. That system is very efficient and is operable to maintain tension levels on the cable up to the maximum heretofore required for most applications. However, there has recently arisen at least one new application for which the anti-slack tensioning apparatus of that application is generally not the most efficient and desirable because of the extremely high tension load levels required to be carried by the cable.

The primary shortcoming of the equipment disclosed in that application occurs at high tension loads as a consequence of the cable being passed around a driven pulley to which the cable is clamped and by rotation of which the anti-slack tension level is maintained on the cable. As the tension levels are increased in that type of anti-slack tensioning apparatus, the pulley shaft, the bearings, the motors etc. must all be increased in size to carry the loads without shaft flexure or motor failure. Finally, the size of the unit becomes impractical because of the expense involved in the maintenance of such large equipment, the inconvenience of servicing it, the power losses involved in operating it, etc.

It has, therefore, been a primary objective of this invention to provide a relatively small, inexpensive anti-slack cable tensioning device operable in a very high tensioning system to maintain relatively high anti-slack tensioning levels on the cable. Specifically, the device might be utilized in a cable system in which the cable normally supports thousands of pounds of loading and requires an anti-slack tension level of more than one thousand pounds. The device accomplishes this objective because it does not support or carry the high tension loads on the cable and consequently may be constructed from small inexpensive components.

Generally, this invention is predicated upon the concept of applying the anti-slack tension to a cable through a tensioning device which does not carry any of the tension loading on the cable.

More specifically, the anti-slack unit of this invention which accomplishes this objective comprises a pair of opposed pulleys or sheaves through which the cable passes and between which it is clamped by pressure operated hydraulic motors. The opposed pulleys are mounted for movement upon a pair of pivotal lever arms so that the clamping force may be applied and maintained while the pulleys "float" with the cable. The pulleys are each driven by a fluid motor at a rate which maintains a predetermined tension on the cable as it is payed out or taken in.

The pulley drive motors are preferably rotary hydraulic motors operable to drive the pulleys in a direction to pull cable from the drum when the cable is being payed out by the winch and operable as pumps to apply drag or bias to the pulleys as cable is pulled between the pulleys by the winch drum drive motor. The amount of drag applied to the cable by the pulleys is regulated by a pressure relief valve or a pressure compensator control through which fluid must pass on the output side of the pump.

The primary advantage of this anti-slack unit over earlier systems is that it enables a relatively small size unit or package to maintain high anti-slack tension levels, as for example 1500 pounds of tension, in a system which often carries very high load levels. Because the unit never is forced to carry the high tension loads applied to the cable, as for example many thousands of pounds of tension, the unit may be a small, inexpensive installation comprised of small, "off the shelf" hydraulic motors, gear reduction units, bearings, shaftings, etc. all of which are readily available from numerous commercial sources.

Another advantage of this unit involves the ease with which it may be installed and maintained. Specifically, one man may remove the unit, service it and reinstall it without the use of winches or any other heavy auxiliary equipment. This is in contrast to prior tensioning devices which, if capable of carrying and maintaining the high tension levels of this unit, required two or three men as well as the use of a winch to remove and service the unit.

Yet another advantage of this invention involves the ease with which it may be mounted upon a relatively light supporting base, or upon existing hardware located in the vicinity of the winch drum as for example the level wind apparatus of the winch.

These and other objects and advantages of this invention will be more readily apparent from the following description of the drawings in which:

FIGURE 2 is a diagrammatic illustration of the tensioning device of FIGURE 1 but with the arrows applied to the hydraulic circuit to indicate the direction of fluid flow in the circuit when cable is pulled through the tensioning unit onto the winch drum.

FIGURE 3 is a diagrammatic illustration of the tensioning device of FIGURE 1, but with the arrows applied to indicate the direction of fluid flow in the circuit when the tensioning unit is not in operation.

Figure 1:
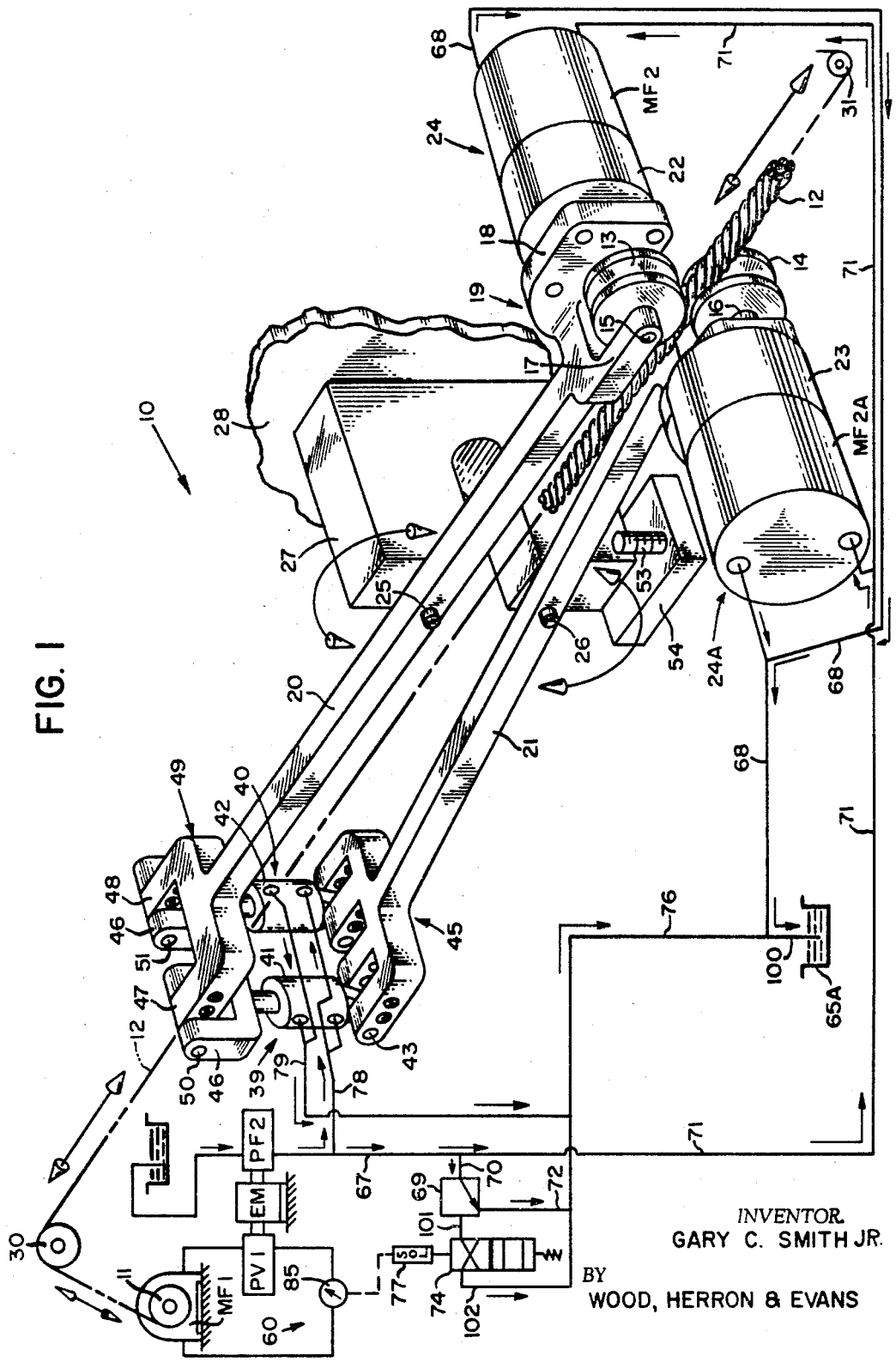
FIGURE 1 is a perspective view of the tensioning device of this invention including hydraulic circuitry for operating the device, the hydraulic circuit being shown in diagrammatic form with arrows applied to indicate the direction of fluid flow through the circuit when cable is paid out from a drum through the tensioning device.

Generally, the tensioning device 10 is operable to maintain an anti-slack tension on the cable 12 through rotation of a pair of hydraulic motor driven pulleys 13, 14. By clamping the cable 12 between these pulleys 13, 14 and then driving them in rotation at a speed and with a force which tends to strip cable off of a winch drum 11, or tends to retard movement of the cable through the pulleys when it is spooled onto the drum 11, slack in the cable between the pulleys and the drum or on the drum is absolutely precluded. Consequently, the cable cannot become "birdcaged" or "buried" on the drum.

The pulleys 13, 14 of the anti-slack unit 10 are both drivingly keyed to support shafts 15, 16 respectively. Each of these shafts 15, 16 is journalled between the legs 17, 18 of a yoke-shaped end section 19 of a support arm 20, 21 and is driven by a drive unit 24, 24a respectively. The legs 18 of the end sections 19 of the arms 20, 21 serve as bases or mounting supports for the drive units 24, 24a, each one of which comprises a gear reduction unit 22, 23 and a rotary fluid motor MF2, MF2A, respectively. The motors MF2, MF2A operate to drive the input shafts of the gear reduction units 22, 23, the output shafts of which drive the pulley support shafts 15, 16. Consequently, each motor, gear reduction unit, and pulley forms a unitary assembly bolted onto one end of the arms 20 and 21 and movable with that arm.

Medially of its ends, each arm 20, 21 is rotatably mounted upon a support pin or fulcrum 25, 26 respectively. The pins 25, 26 are fixedly secured to a stationary support block 27 which is in turn bolted or secured to a stationary base 28. This base may be a part of a stationary support stanchion, a bulkhead of a ship, a part of a level wind mechanism of a winch, or any other conveniently located support for the tensioning mechanism. Preferably the support 28 and block 27 are located between two stationary pulleys 30, 31 so that the anti-slack unit remains in a fixed position relative to the cable. However, because the pulleys 13, 14 are movably supported by the pivot arms 20, 21 they accommodate limited vertical movement of the cable.

Clamping pressure for securing the cable between the pulleys 13 and 14 is supplied by a pair of expansible chamber hydraulic motors 39, 40. The cylinders 41, 42 of these motors are pivotally secured at their lower ends by pivot pins 43, 44 to an end section 45 of the pivot arm 21 while the pistons 43, 44 terminate in yokes 46 which are pivotally secured by pins 50 and 51 to legs 47, 48 of a Y-shaped end section 49 of the pulley support arm 20. The pins 43, 44, 50 and 51 which pivotally connect the cylinders 41, 42 and the pistons 43, 44 of these motors 39, 40 to the end sections 45, 49 of the arms may be adjustably located in any one of several parallel apertures in the end sections 45, 49 of the legs 21 and 20 so as to vary the clamping pressure applied by the pulleys to the cable.

To avoid having the arms 20, 21 hanging or dangling from the pivot pins 25, 26 when the anti-slack unit is not in use, an adjustable stop in the form of a screw 53 is threaded into a flange 54 of the support block 27 in a position to be engaged by the bottom surface of the pivoted arm 21. When the cable 12 is not in use and does not support the arms, the lower arm 21 rests on this stop 53 while the pulley 13 of the upper arm rests on the pulley 14 of the lower arm.

Because of the large mechanical advantage obtained through the relatively long lever arms 20, 21, a pair of relatively small hydraulic motors 39, 40 may be utilized to apply the required clamping pressure to the cable. This pressure may go up to 1000 pounds compression force on the cable. Similarly, because relatively small size rotary hydraulic motors have large horsepower ratings, relatively small and light weight hydraulic motors MF2, MF2A may be utilized to drive the pulleys so as to apply the requisite tension to the cable. Specifically, in one preferred application, it has been found that hydraulic motors MF2, MF2A rated at 10 horsepower are sufficient to maintain up to 1500 pounds of tension on a one inch cable 12 at normal operating speeds.

If necessary to prevent slippage between the pulleys and the cable (as may occur in the event of accumulation of grease and debris on the pulleys), steel treads corresponding in pitch and lead to the wrap of the cable 12 may be machined into the periphery of the pulleys 13, 14. However, experience with this equipment has so far indicated that treads are not necessary to maintain 1500 pounds of tension on a one-inch diameter cable.

The winch 11 upon which the cable 12 is stored, comprises a hydraulic motor MF1 operable to drive the winch drum 11 in a direction to either pay out or spool in cable. The hydraulic motor MF1 is a reversible motor operable through a conventional hydraulic circuit 60 to drive the drum in either a forward or reverse direction. The pump PV1 which supplies the hydraulic pressure to operate the motor MF1 is driven by an electric motor EM which is also operable to drive a second pump PF2 for supplying fluid pressure for the anti-slack unit.

In addition to the pump PF2, the hydraulic circuit for operating the clamping motors 39, 40 and the pulley drive motors MF2, MF2A comprises a solenoid operated four-way valve 74, and a pressure relief valve 69. Generally this hydraulic circuit applies a tensioning pressure to the cable 12 as a consequence of the constant volume pump PF2 supplying sufficient flow to the motors MF2, MF2A to operate them at a speed to pull or strip cable from the drum 11 irrespective of the direction of drum rotation or the speed at which the drum is rotated. All excess fluid not required by the motors is routed through the pressure relief valve 69, the setting of which determines the pressure or pull applied by the motors MF2, MF2A to the cable.

The functioning of this circuit to control the operation of the anti-slack unit can best be further described in relation to an operational cycle of the system.

Referring first to FIGURE 1, arrows indicate the direction of fluid flow in the circuit when the drum 11 is paying out cable and the anti-slack unit 10 is activated by energization of the solenoid 77. The solenoid 77 may either be actuated manually or automatically as is explained more fully hereinafter. In this example, it is assumed that the pump PF2 has a capacity of ten gallons per minute, which must either pass through the motors MF2, MF2A into the exhaust conduits 68 or through the relief valve 69 and line 72 to exhaust. If the winch drum 11 is operated very slowly, the pulleys 13, 14 and thus the motors MF2, MF2A are also rotated very slowly so that very little fluid passes through the motors MF2, MF2A into the exhaust conduit 68. The remainder of the ten gallons per minute must then flow through conduit 70 and pressure relief valve 69 into the exhaust conduit 72. The force applied to the cable to pull cable off the winch drum is then dependent upon and a function of the pressure setting of the pressure relief valve 69. If this pressure is set for 1500 pounds, the force applied to the cable 12 by rotation of the pulleys 13, 14 will be 1500 pounds of tension.

Referring now to FIGURE 2, the arrows of this figure indicate the direction of fluid flow in the circuit when the system is in a condition in which the anti-slack unit is activated by energization of the solenoid 77 and the winch drum is operated to pull in cable onto the drum. Under these conditions, the pump PV2 operates to pump 10 gallons per minute into the conduit 67. None of the flow from the pump PF2 can now pass through the motors MF2, MF2A since they are now being driven in reverse or as pumps by the cable. The motors MF2, MF2A now pump fluid up from the reservoir or tank 65A, through the conduit 68 and the motors MF2, MF2A, through lines 71 and 70, via the pressure relief valve 69, and line 72 and 76 back to the tank 65A. Assuming the motors MF2, MF2A to have a combined maximum capacity of ten gallons per minute, the flow through the pressure relief valve 69 into the exhaust conduit 72 varies between 10 and 20 gallons per minute depending upon the linear speed of the cable 12. From the conduit 72, ten gallons per minute flows back through conduits 76, 100 to the tank while simultaneously the remainder of the fluid flowing in lines 72 and 76 flows back through line 68 into and through the motors MF2, MF2A. Thus, under these conditions, the motors MF2, MF2A, while acting as pumps to force fluid through the pressure relief valve 69, serve as brakes on the pulleys and apply a tension to the cable 12 while the cable is being pulled between the pulleys 13 and 14.

Referring now to FIGURE 3, the anti-slack unit is illustrated in an inactive condition with the solenoid 77 de-energized. In this condition of the hydraulic circuit, the motors MF2 and MF2A are free wheeling since the pressure relief valve 69 is effectively bypassed. In this condition of the circuit, the pump PF2 continues to pump fluid at 10 gallons per minute, all of which is free to flow at atmospheric pressure through conduits 67, 70, pressure relief valve 69 and conduits 101, 102 and 76 back to the tank 65A. The pressure in conduits 78 and 79 is then equal so that there is equal pressure acting upon opposite sides of the pistons of the hydraulic motors 39, 40. Consequently, the pulleys 13 and 14 exert no clamping pressure on the cable 12. With the pulleys 13 and 14 thus free wheeling, any rotation of the pulleys as a consequence of frictional contact between the pulleys and the cable 12 while the cable is being spooled onto the drum will result in the motors MF2, MF2A being driven as pumps in which condition fluid will be supplied to the motors via the conduit 68 and will be returned to tank from the motors MF2, MF2A via the conduits 71, 70, pressure relief valve 69 and the conduits 101, 102 and 76. Alternatively, if the winch drum is operated in a direction to pay out cable, the motors MF2, MF2A may be rotated by the pulleys in a direction to pull fluid from conduits 67, 70, 71 through the motors MF2, MF2A back to the tank via the conduits 68, 76 and 100. In both cases, however, there is no net pressure buildup between the intake and outlet ports of the motors MF2, MF2A so that the motors have no net effect upon the cable.

To minimize the size of electric motor EM required to drive the system, a pressure actuated switch 85 is preferably connected to the high pressure line of the winch hydraulic drive circuit 60. This switch is connected in series with the solenoid 77 so that high pressure in this line opens the circuit to the solenoid 77 and de-energizes it. Since the pressure in this line is a function of the tension in the cable 12, this switch is set so as to be actuated only at very high tension levels in the cable, i.e., tension levels substantially above 1500 pounds, when there is absolutely no necessity or purpose to be served by adding the tensioning of the anti-slack system to the already high tension levels of the cable. Thus, the addition of this simple pressure switch enables the power requirement of the electric motor EM to be reduced. By way of illustration, assume that the motor EM is required to drive the drum and take in cable with a maximum tension of 7000 pounds tension on the cable. If the anti-slack system is set for 1500 pounds tension on the cable, the pressure switch may be set so that it automatically de-energizes the solenoid 77 and enables the anti-slack system to be free wheeling at tensions above 2000 pounds. Thus, motor EM is never required to handle both the maximum tension loads on the cable plus the tension of the anti-slack unit, or 8500 pounds tension in the example.

While I have illustrated and described only one hydraulic control network for operating the anti-slack tensioning device, it will readily be appreciated that other forms of hydraulic control circuits may be applied to operate the tensioning unit 10. Specifically, the several forms of hydraulic network disclosed in application, Ser. No. 620,724 filed Mar. 6, 1967 and assigned to the assignee of this application, are equally applicable to this tensioning device. Similarly, other changes and modifications may be made in the tensioning device without departing from the spirit of my invention.

Having described my invention, I claim:

1. A tensioning device for maintaining a predetermined anti-slack tension level on a cable as the cable is payed out from a drum, taken in on the drum, or while the cable remains stationary on said drum, said device comprising
   a pair of opposed pulleys adapted to be mounted upon opposite sides of said cable,
   a pair of support shafts, said shafts being in driving engagement with said pulleys,
   a pair of pulley driving motors, each of said motors being operable to drive one of said pulley support shafts,
   means including at least one motor for clamping said pulleys against said cable with a predetermined force, said pulleys when clamped against said cable having only tangential line contact with the cable so that load tension on the cable is not transmitted to the pulley support shafts, and
   means supporting said pulleys for tandem parallel movement in a plane normal to the axis of rotation of said pulleys while said pulleys remain clamped to said cable so that said tangential line contact of the pulleys with the cable and said anti-slack tension is maintained as the clamped cable moves in said plane.

2. The tensioning device of claim 1 wherein said pair of pulley driving motors are hydraulic motors.

3. The tensioning device of claim 2 wherein said pair of pulley driving motors are rotary hydraulic motors and said clamping motor comprises at least one expansible chamber hydraulic motor.

4. A tensioning device for maintaining a predetermined anti-slack tension level on a cable as the cable is payed out from a drum, taken in on the drum, or while the cable remains stationary on said drum, said device comprising
   a pair of opposed pulleys adapted to be mounted upon opposite sides of said cable,
   a pair of pulley support shafts, each of said pulleys being drivingly mounted upon one of said shafts,
   a first motor means for drivingly rotating both of said pulley support shafts,
   a second motor means for clamping said pulleys against said cable with a predetermined force, said cable when clamped between said pulleys extending generally tangentially to both of said pulleys so that load tension on said cable is not transferred to said pulley support shafts, and
   means supporting said pulleys for tandem parallel movement in a plane normal to the axis of rotation of said pulleys while said pulleys remain clamped to said cable so that said tangential line contact of the pulleys with the cable and said anti-slack tension is maintained as the clamped cable moves in said plane.

5. The tensioning device of claim 4 wherein said first and second motor means are all hydraulic motors.

6. The tensioning device of claim 4 wherein said first motor means comprises a pair of rotary hydraulic motors and said second motor means comprises at least one expansible chamber hydraulic motor.

7. For use in combintion with a reel of cable stored upon a drum, a tensioning device for maintaining a predetermined anti-slack tension level on the cable, said tensioning device comprising
   a base,
   a pair of rocker arms pivotally mounted upon said base intermediate their ends, said arms being adapted to be mounted upon opposite sides of said cable so as to extend generally parallel to said cable, a pair of opposed pulleys, each of said pulleys being rotatably mounted upon one end of each of said arms, at least one clamping motor means mounted upon said rocker arms for forcing said one end of said arms together so as to clamp said cable between said pulleys with a predetermined force, motor means for driving at least one of said pulleys in rotation so as to maintain a predetermined anti-slack tension level on said cable, and said rocker arms being so supported upon said base that said pulleys are capable of tandem parallel movement in a plane normal to the axis of rotation of said pulleys while said pulleys remain clamped to said cable so that said tangential line contact of the pulleys with the cable and said anti-slack tension is maintained as the clamped cable moves in said plane.

8. The tensioning device of claim 7 wherein the motors of said pulley driving motor means and said clamping motor means are all hydraulic motors.

9. The tensioning device of claim 8 wherein said pulley driving motor means comprises a pair of rotary hydraulic motors, one of said pair of motors being mounted upon each of said arms and in driving engagement with the pulley mounted upon that arm.

10. The tensioning device of claim 9 which further includes a pair of gear reduction units, one of said pair of gear reduction units being mounted upon each of said arms, said gear reduction units being driven from that rotary hydraulic motor mounted upon the same arm and being operable to drive the pulley on the same arm.

11. The tensioning device of claim 7 wherein said clamping motor means comprises a pair of parallel connected and mounted expansible chamber hydraulic motors having their cylinders connected to one of said arms and their pistons connected to the other of said arms.

12. In combination with a hydraulic motor driven drum having cable stored thereon, a tensioning device for maintaining a predetermined anti-slack tension level on the cable as the cable is payed out from the drum, taken in on the drum, or while the cable remains stationary on said drum, said device comprising a pair of pulley support shafts, a pair of pulleys mounted upon said shafts and adapted to be mounted upon opposite sides of said cable and to clamp said cable therebetween, said cable when clamped between said pulleys extending generally tangentially to both of said pulleys so that tension loads on said cable are not transferred to said pulley support shafts, a pair of hydraulic motors, each of said motors being operable to drive one of said pulleys, means including a hydraulic motor for clamping said pulleys against said cable with a predetermined force, and means supporting said pulleys for tandem parallel movement in a plane normal to the axis of rotation of said pulleys while said pulleys remain clamped to said cable so that said tangential line contact of the pulleys with the cable and said anti-slack tension is maintained as the clamped cable moves in said plane.

13. The combination of claim 12 in which said drum driving motor, said pair of pulley driving motors, and said clamping motor are all driven by hydraulic pressure from pumps which are driven from a single electric motor.

14. In combination with a cable stored upon a hydraulic motor driven drum, a tensioning device for maintaining a predetermined anti-slack tension level on the cable, said tensioning device comprising a base, a pair of rocker arms pivotally mounted upon said base, said arms being adapted to be mounted upon opposite sides of said cable so as to extend generally parallel to said cable, a pair of opposed pulleys, each of said pulleys being rotatably mounted upon one end of each of said arms, clamping motor means including at least one hydraulic motor for forcing the pulley supporting ends of said arms together so as to clamp said cable between said pulleys with a predetermined force, means including at least one hydraulic motor for driving both of said pulleys in rotation so as to maintain a predetermined anti-slack tension level on said cable, and said rocker arms being so supported upon said base that said pulleys are capable of tandem parallel movement in a plane normal to the axis of rotation of said pulleys while said pulleys remain clamped to said cable so that said tangential line contact of the pulleys with the cable and said anti-slack tension is maintained as the clamped cable moves in said plane.

15. The combination of claim 14 wherein said drum drive hydraulic motors, said hydraulic clamping motor, and said hydraulic pulley driving motor are all driven by hydraulic pressure from pumps which are driven by a single electric motor.

References Cited
UNITED STATES PATENTS

| | | | |
|---|---|---|---|
| 3,014,628 | 12/1961 | Littlehale | 226—177 |
| 3,093,284 | 6/1963 | Mullin | 226—186 |
| 3,300,187 | 1/1967 | Saxe | 254—175.7 |

EVON C. BLUNK, Primary Examiner

HARVEY C. HORNSBY, Assistant Examiner

U.S. Cl. X.R.

226—177